US012620727B2

(12) United States Patent
Rouillard et al.

(10) Patent No.: US 12,620,727 B2
(45) Date of Patent: May 5, 2026

(54) CRIMP TERMINAL WITH MECHANICAL LOCKING TO SECURE A WIRE

(71) Applicants: Tyco Electronics France SAS, Pontoise (FR); TE Connectivity India Private Limited, Bangalore (IN)

(72) Inventors: Xavier Rouillard, Pontoise (FR); Joseph Daher, Pontoise (FR); Sundareshan M D, Pontoise (FR)

(73) Assignees: TE Connectivity Solutions GmbH, Schaffhausen (CH); TE Connectivity India Private Limited, Bangalore (IN)

( * ) Notice: Subject to any disclaimer, the term of this patent is extended or adjusted under 35 U.S.C. 154(b) by 288 days.

(21) Appl. No.: 17/969,983

(22) Filed: Oct. 20, 2022

(65) Prior Publication Data

US 2023/0055994 A1 Feb. 23, 2023

Related U.S. Application Data

(63) Continuation of application No. PCT/IB2021/000278, filed on Apr. 16, 2021.

(30) Foreign Application Priority Data

Apr. 20, 2020 (IN) ............................ 202041016885

(51) Int. Cl.

*H01R 4/18* (2006.01)
*H01R 4/26* (2006.01)
*H01R 43/16* (2006.01)

(52) U.S. Cl.

CPC ............ *H01R 4/188* (2013.01); *H01R 4/184* (2013.01); *H01R 4/26* (2013.01); *H01R 43/16* (2013.01)

(58) Field of Classification Search

CPC .......... H01R 4/188; H01R 4/184; H01R 4/26; H01R 43/16

(Continued)

(56) References Cited

U.S. PATENT DOCUMENTS

| | | | | |
|---|---|---|---|---|
| 2,992,404 A * | 7/1961 | Berg | H01R 13/115 | 439/849 |
| 3,137,925 A * | 6/1964 | Wahl | H01R 43/058 | 439/879 |

(Continued)

FOREIGN PATENT DOCUMENTS

| | | |
|---|---|---|
| CN | 101662081 A | 3/2010 |
| CN | 103827236 A | 5/2014 |

(Continued)

OTHER PUBLICATIONS

Korean Office Action dated Jun. 28, 2024 with English translation, corresponding to Application No. 10-2022-7040511, 15 pages.

(Continued)

*Primary Examiner* — Peter G Leigh
(74) *Attorney, Agent, or Firm* — Barley Snyder

(57) ABSTRACT

A crimp terminal includes a crimping segment having a base, a first side wall extending from the base, and a second side wall extending from the base opposite the first side wall. The crimping segment has a first surface adapted for arranging a wire thereon along a longitudinal axis and a second surface opposite the first surface. The first side wall has a first serration on the second surface. The second side wall has a pair of second serrations on the second surface. The first serration is displaced from the second serrations along the longitudinal axis and, in a crimped state, a portion of the first serration is positioned between a pair of portions of the second serrations along the longitudinal axis.

15 Claims, 5 Drawing Sheets

(58) Field of Classification Search
USPC .......................................................... 439/877
See application file for complete search history.

(56) References Cited

U.S. PATENT DOCUMENTS

| | | | | |
|---|---|---|---|---|
| 3,387,080 | A * | 6/1968 | Dibble ................... | H01R 4/186 403/396 |
| 4,815,200 | A * | 3/1989 | Ito ........................ | H01R 43/055 29/874 |
| 5,338,233 | A * | 8/1994 | Endo ...................... | H01R 4/185 439/865 |
| 5,425,662 | A * | 6/1995 | Villeneuve ............. | H01R 4/185 439/882 |
| 6,232,555 | B1 | 5/2001 | Besler et al. | |
| 8,333,624 | B2 * | 12/2012 | Kakuta .................. | H01R 4/185 439/877 |
| 10,594,048 | B2 | 3/2020 | Bluemmel et al. | |
| 2010/0055998 | A1 | 3/2010 | Aihara | |
| 2011/0028054 | A1 | 2/2011 | Tanaka et al. | |
| 2013/0012077 | A1 | 1/2013 | Sato et al. | |
| 2014/0220835 | A1 * | 8/2014 | Seipel .................... | H01R 4/185 439/877 |
| 2016/0240936 | A1 | 8/2016 | Yudate | |

FOREIGN PATENT DOCUMENTS

| | | | | |
|---|---|---|---|---|
| CN | 107207923 | A | 9/2017 | |
| CN | 110034419 | A | 7/2019 | |
| DE | 4312641 | A1 | 10/1994 | |
| DE | 102006045567 | A1 * | 4/2008 | ............. H01R 4/184 |
| EP | 0619623 | A1 | 10/1994 | |
| EP | 2919332 | A1 | 3/2014 | |
| GB | 1452785 | A | 10/1976 | |
| GB | 2097401 | A | 11/1982 | |
| JP | S579172 | U | 1/1982 | |
| JP | H3121661 | U | 12/1991 | |
| JP | H0584032 | U | 11/1993 | |
| JP | H076800 | A | 1/1995 | |
| JP | 2009260232 | A | 11/2009 | |
| JP | 2010027505 | A | 2/2010 | |
| JP | 2012031253 | A | 2/2012 | |
| JP | 2015222737 | A | 12/2015 | |
| JP | 6016999 | B2 | 10/2016 | |
| JP | 2017082144 | A | 5/2017 | |

OTHER PUBLICATIONS

PCT International Search Report and Written Opinion, Application No. PCT/IB2021/000278, Dated: Aug. 12, 2021, 11 pages.
Japanese Office Action dated Mar. 5, 2024 with English translation, corresponding to Application No. 2022-562989, 8 pages.
Chinese Office Action with English translation dated Dec. 14, 2024, corresponding to Application No. 202210990829.5, 19 pages.
Chinese Office Action dated Dec. 22, 2025 with English translation, corresponding to Application No. 202180029272.2, 13 pages.

* cited by examiner

CRIMP TERMINAL WITH MECHANICAL LOCKING TO SECURE A WIRE

CROSS-REFERENCE TO RELATED APPLICATIONS

This application is a continuation of PCT International Application No. PCT/IB2021/000278, filed on Apr. 16, 2021, which claims priority under 35 U.S.C. § 119 to Indian Patent Application No. 202041016885, filed on Apr. 20, 2020.

FIELD OF THE INVENTION

The invention relates to a crimp terminal for terminating a wire and an electrical connector comprising a crimp terminal. The invention further relates to a method for preparing an electrical connector.

BACKGROUND

Crimp terminals can be used, for instance, for connectors in the automobile industry. Crimp terminals known in the art can be provided with serrations on their inner surface, i.e. on the surface receiving an electrical wire. These serrations are used for cutting into the surface of the wire to remove the presence of oxide layers and thus improve the electrical contact between the wire and such crimp terminal.

Crimp terminals also provide to the crimped wires a certain level of resistance to pull-out force. The pull-out force is the force which is required to pull the crimped wire out of the crimp terminal. However, under certain particular conditions of unexpected high loads, known crimp terminals may not provide sufficient tension strength for preventing the wire to slide within the crimp terminal, thereby damaging the electrical contact. This can have a negative effect on the lifetime of an electrical connector comprising such crimp terminal.

SUMMARY

A crimp terminal includes a crimping segment having a base, a first side wall extending from the base, and a second side wall extending from the base opposite the first side wall. The crimping segment has a first surface adapted for arranging a wire thereon along a longitudinal axis and a second surface opposite the first surface. The first side wall has a first serration on the second surface. The second side wall has a pair of second serrations on the second surface. The first serration is displaced from the second serrations along the longitudinal axis and, in a crimped state, a portion of the first serration is positioned between a pair of portions of the second serrations along the longitudinal axis.

BRIEF DESCRIPTION OF THE DRAWINGS

The invention will now be described by way of example with reference to the accompanying Figures, of which.

DETAILED DESCRIPTION OF THE EMBODIMENT(S)

Features and advantages of the invention will be described with reference to the drawings. In the description, reference is made to the accompanying figures that are meant to illustrate embodiments of the invention. It is understood that such embodiments do not represent the full scope of the invention.

The accompanying drawings are incorporated into the specification and form a part of the specification to illustrate several embodiments of the present invention. These drawings, together with the description, explain the principles of the invention. The drawings are merely for the purpose of illustrating examples of how the invention can be made and used, and are not to be construed as limiting the invention to only the illustrated and described embodiments. Furthermore, several aspects of the embodiments may form—individually or in different combinations—solutions according to the present invention. The following described embodiments thus can be considered either alone or in an arbitrary combination thereof. Further features and advantages will become apparent from the following more particular description of the various embodiments of the invention, as illustrated in the accompanying drawings, in which like references refer to like elements.

Figure 1:
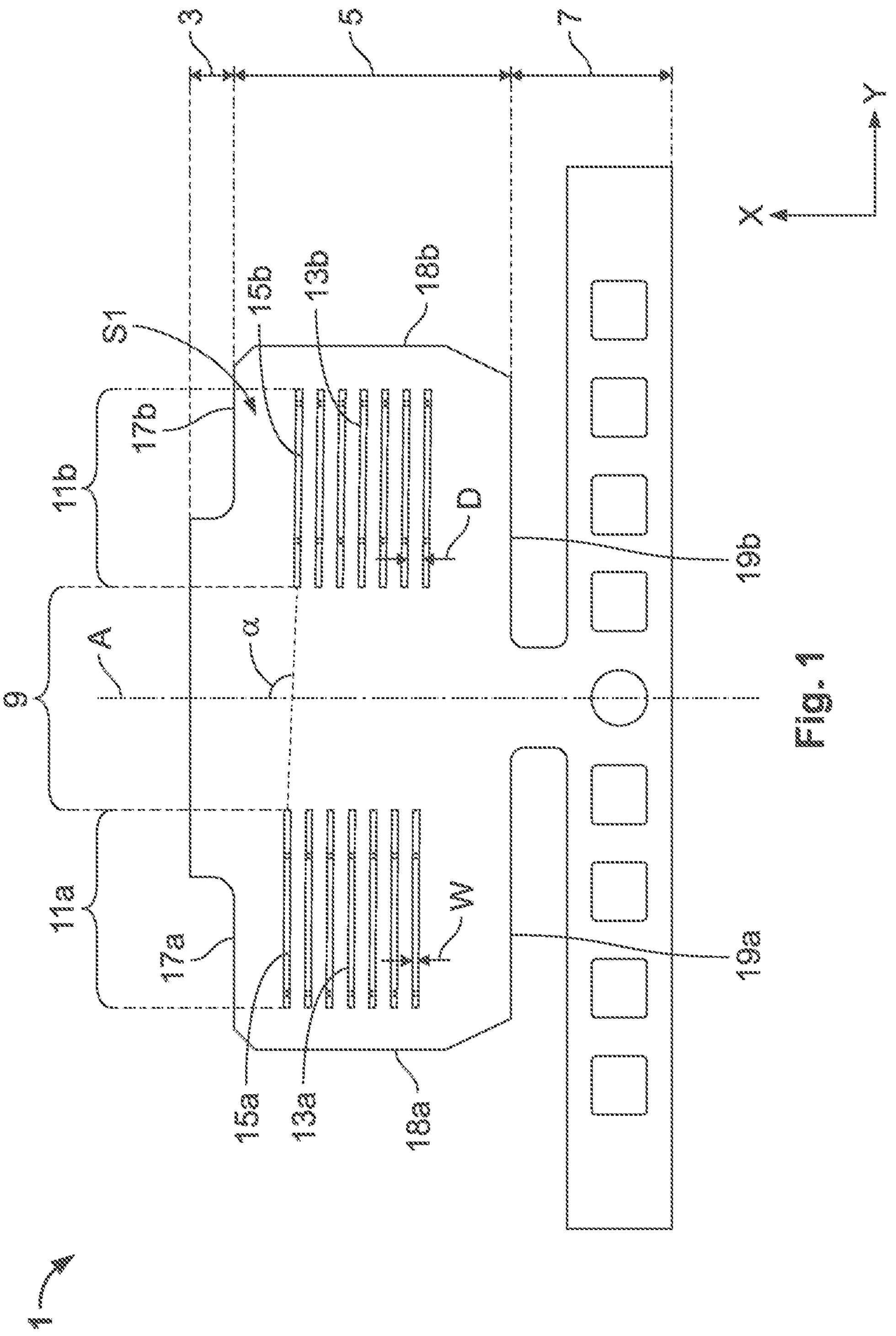
FIG. 1 is a plan view of a crimp terminal according to a first embodiment in an uncrimped state.

FIG. 1 is a plan view of a crimp terminal 1 according to a first embodiment of the inventive crimp terminal for terminating a wire. The crimp terminal 1 is represented in a flat configuration in FIG. 1.

The crimp terminal 1 may be made of a metal sheet. The crimp terminal 1 comprises an electrical contact segment 3 and a crimping segment 5 adjacent to the electrical contact segment 3. At another end of the crimping segment 5, the crimp terminal 1 comprises an electrical pin or socket contact element in an end segment 7.

The electrical contact segment 3 is configured to receive a mating contact. The electrical contact segment 3 can be of any shape so as to accommodate any particular mating contact. Thus, the crimp terminal 1 is adapted for any one of a male or female contact of various shapes.

The crimping segment 5 is configured for receiving a core-wire, i.e. stripped conductors of a wire along a longitudinal axis A of the crimping segment 5. As shown in FIG. 1, the crimping segment 5 comprises a base 9 and opposing first and second side walls 11*a*, 11*b* extending from the base 9. The first and second side walls 11*a*, 11*b* extend from the base 9 along a direction perpendicular to the longitudinal axis A.

The first side wall 11*a* and the second side wall 11*b* are configured to be folded towards the longitudinal axis A so as to crimp a wire arranged in the crimping segment 5. A method for preparing an electrical connector comprising such a crimp terminal 1 is described later on.

FIG. 1 only shows a first surface S1 of the crimping segment 5. In the crimped state of the crimp terminal 1, the first surface S1 corresponds to the inner surface of the crimp terminal 1, i.e. the surface in contact with the crimped wire.

Figure 2:
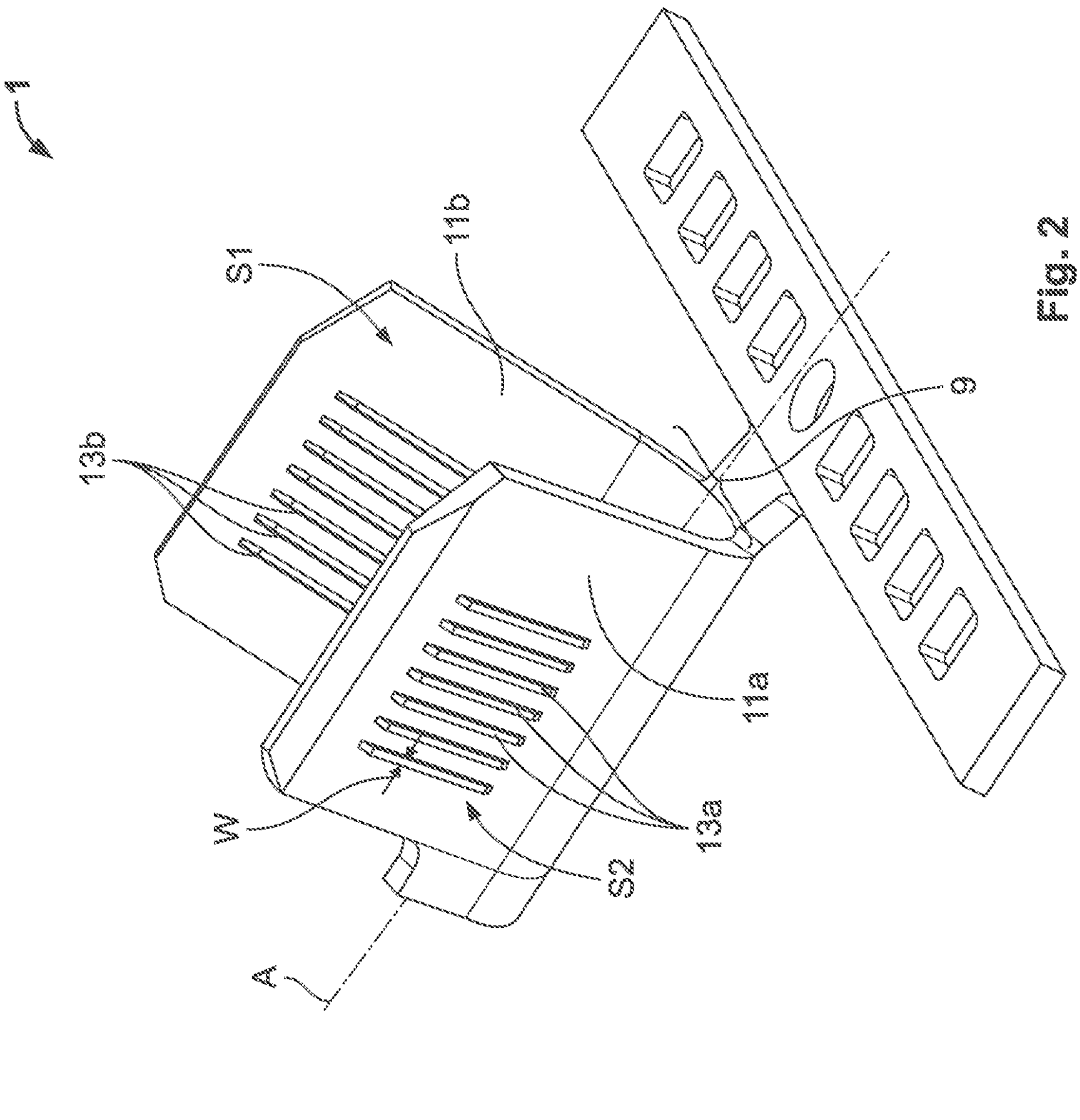
FIG. 2 is a perspective view of the crimp terminal of FIG. 1 in a partially folded state.

FIG. 2, which illustrates the crimp terminal 1 in a partially folded state, shows the second surface S2 of the crimping segment 5, opposite to the first surface S1. In the crimped state of the crimp terminal 1, the second surface S2 corresponds to the outer surface of the crimp terminal 1, i.e. the surface that is not in contact with the crimped wire.

In the following, the crimp terminal 1 is described in reference to both FIG. 1 and FIG. 2.

The crimp terminal 1 is provided on each side wall 11*a*, 11*b* with serrations 13*a*, 13*b* on the first surface S1 as well as on the second surface S2. Hence, each side wall 11*a*, 11*b* of the crimp terminal 1 respectively comprises serrations 13*a*, 13*b* on both its surfaces S1, S2, as can be seen in FIG. 2. A protruding serration on the first surface S1 corresponds to a recess on the opposite second surface S2. Hence, a serration 13*a*, 13*b* forms a protrusion on one of the surfaces S1, S2 and a recess on the opposite surface S1, S2. This is because the serrations 13*a*, 13*b* can be manufactured by punching the crimping segment 5. This structural aspect is further described in reference to FIG. 4. The invention can be achieved with the first side wall 11*a* comprising at least one serration 13*a* on the second surface S2 and the second side wall 11*b* comprising at least two serrations 13*b* on the second surface S2. In the first embodiment represented in FIGS. 1 and 2, each side wall 11*a*, 11*b* comprises a plurality of serrations 13*a*, 13*b*.

Each serration 13*a*, 13*b* longitudinally extends along a direction substantially perpendicular to the longitudinal axis A of the crimping segment 5. As illustrated in FIG. 1, each serration 13*a*, 13*b* thus extends along a direction parallel to the axis Y. The serrations 13*a* of the first side wall 11*a* are parallel to each other. The same is true for the serrations 13*b* of the second side wall 11*b*. The serrations 13*a*, 13*b* are of a same dimension in the shown embodiment. The dimensions of the serrations 13*a*, 13*b* can be adapted according to the wire to be crimped.

The serrations 13*a* of the first side wall 11*a* are however displaced from the serrations 13*b* of the second side wall 11*b* along the longitudinal axis A of the crimping segment 5. Hence, in a crimped state of the crimp terminal 1, as illustrated in FIG. 3, the serrations 13*a* of the first side wall 11*a* are configured to be interlocked with the serrations 13*b* of the second side wall 11*b* along the longitudinal axis A.

As can be seen in FIG. 1, a first serration 15*a* of the first side wall 11*a* is not aligned with a first corresponding serration 15*b* of the second side wall 11*b*, as shown by the angle α which does not form a right-angle with the longitudinal axis A. The serrations 13*a* of the first side wall 11*a* are displaced from the serrations 13*b* of the second side wall 11*b* by an offset, which is at least a width W of the serrations 13*a*, 13*b*, shown in FIG. 2. As can be seen in FIG. 1, the width W of the serrations 13*a* of the first side wall 11*a* corresponds to the distance d between two successive serrations 13*b* of the second side wall 11*b*. Therefore, in the crimped state, the serrations 13*a*, 13*b* realize a form-fit connection. Hence, an interlocking of the serrations 13*a*, 13*b* is rendered possible in the crimped state.

As can be seen in FIG. 1, on each side wall 11*a*, 11*b*, the serrations 13*a*, 13*b* are spaced from the free-edges 17*a-b*, 18*a-b*, 19*a-b* of the side wall 11*a*, 11*b*. Hence, the stiffness of the crimping segment 5 can be made so as to facilitate the crimping of the crimp terminal 1. The stiffness of the crimping segment 5 can thus be adapted according to the wire foreseen to be crimped. In a variant, the serrations 13*a*, 13*b* are elongated up to the free-edges 18*a*, 18*b*, which correspond to edges extending along a direction parallel to the longitudinal axis A.

Figure 3:
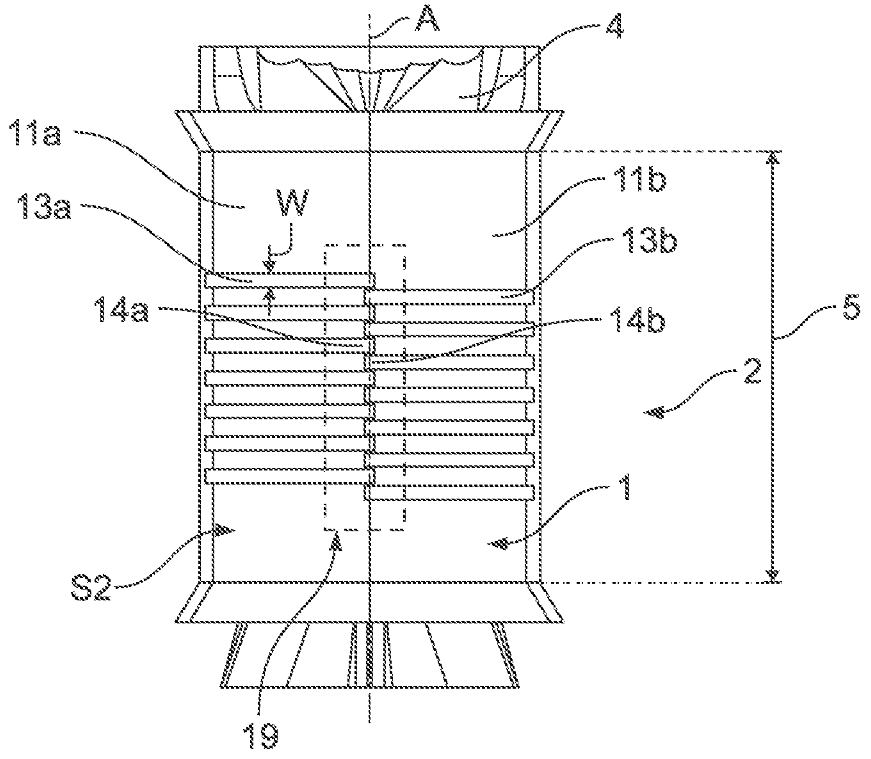
FIG. 3 is a plan view of an electrical connector according to the invention in a crimped state.

FIG. 3 illustrates an electrical connector 2 in the crimped state comprising the crimp terminal 1 and a wire 4. Elements with the same reference numeral already described and illustrated in FIG. 1 and FIG. 2 will not be described in detail again but reference is made to their description above.

In the crimped state shown in FIG. 3, a portion 14*a* of the serrations 13*a* of the first side wall 11*a* is positioned between portions 14*b* of serrations 13*b* of the second side wall 11*b* along said longitudinal axis A. As illustrated by the dotted zone 19 in FIG. 3, the portions 14*a*, 14*b* of the serrations 13*a*, 13*b* realize a form-fit connection in the crimped state. The portions 14*a*, 14*b* can correspond to end-portions of the serrations 13*a*, 13*b*. The form-fit connection allows joining the serrations 13*a*, 13*b* by mechanical locking. The serrations 13*a*, 13*b* are thus interlocked in the crimped state.

FIG. 3 also shows that each serration 13*a*, 13*b* has a rectangular cross-sectional shape. Hence, when a pull-out force is generated on the wire 4 along the longitudinal axis A, i.e. substantially perpendicularly to planar surfaces of each serration 13*a*, 13*b*, compressive and shear stresses are advantageously generated. The resistance of the crimp terminal 1 against a pull-out force applied in a direction parallel to the longitudinal axis of the crimping segment 5 can thus be increased. In a variant, each serration 13*a*, 13*b* has a substantially trapezoidal cross-sectional shape.

By providing serrations 13*a*, 13*b* on the first surface S1 and on the second surface S2 of the crimping segment 5, the crimping segment 5 can be rendered structurally stronger and stiffer. The presence of serrations 13*a*, 13*b* on the second surface S2, i.e. the outer surface of the crimping segment 5, allows improving the structural parameters of the crimp terminal 1.

Figure 4:
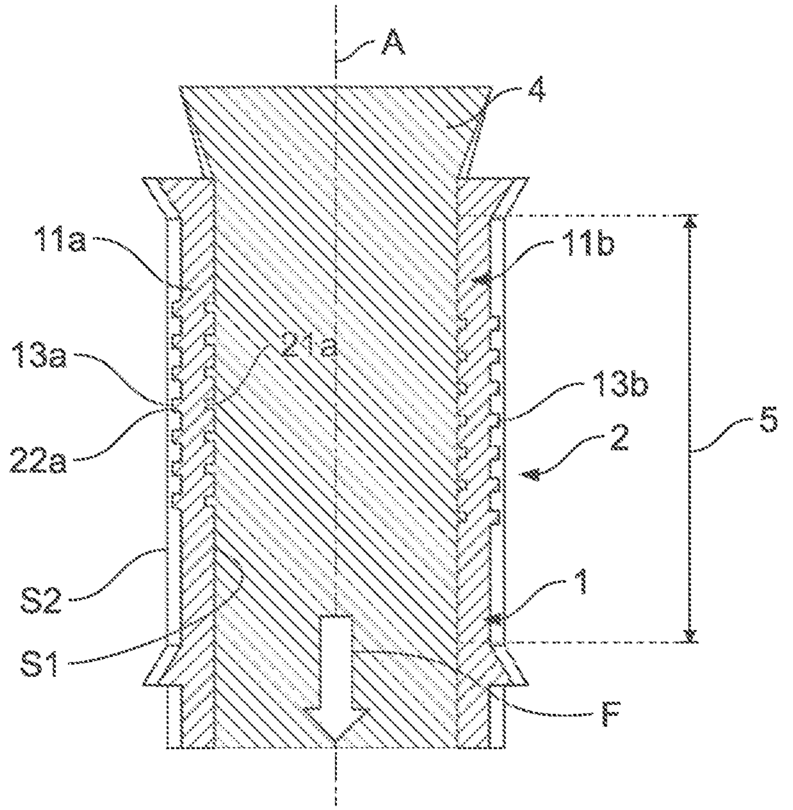
FIG. 4 is a sectional plan view of the electrical connector of FIG. 3.

The first surface S1 is visible in FIG. 4. FIG. 4 illustrates a schematic cut view of the electrical connector 2 illustrated in FIG. 3. Elements with the same reference numeral already described and illustrated in FIGS. 1 to 3 will not be described in detail again but reference is made to their description above.

FIG. 4 shows that each serration 13*a*, 13*b* comprises a recess 21*a* on the first surface S1 that corresponds to a protrusion 22*a* on the opposite second surface S2. This is because the serrations 13*a*, 13*b* can be manufactured by punching the crimping segment 5. The interlocking of the serrations 13*a*, 13*b* in the crimped state allows improving the mechanical behavior of the crimp terminal 1, such as the resistance against a pull-out force F applied in a direction parallel to the longitudinal axis A of the crimping segment 5.

The serrations 13*a*, 13*b* on both surfaces S1, S2 of the crimp terminal 1 thus allow increasing the compression of the wire 4 in the crimp terminal 1 in the crimped state, thereby decreasing the electrical resistance between the wire 4 and the crimp terminal 1. As a result, the electrical contact—and thus the electrical stability—between the crimp terminal 1 and the wire 4, can be improved. Hence, the mechanical and electrical characteristics of the electrical connector 2 can be enhanced.

On the first surface S1 of the crimping segment 5, i.e. on the inner surface, the serrations 13*a*, 13*b* can be used to cut into the surface of the wire 2 to remove non-conducting surface oxide layers that may be present. The serrations 13*a*, 13*b* on the first surface S1 allow ensuring that, even in the presence of such oxide layers, a reliable electrical contact is achieved between the wire 2 and the crimping segment 5.

Figure 5:
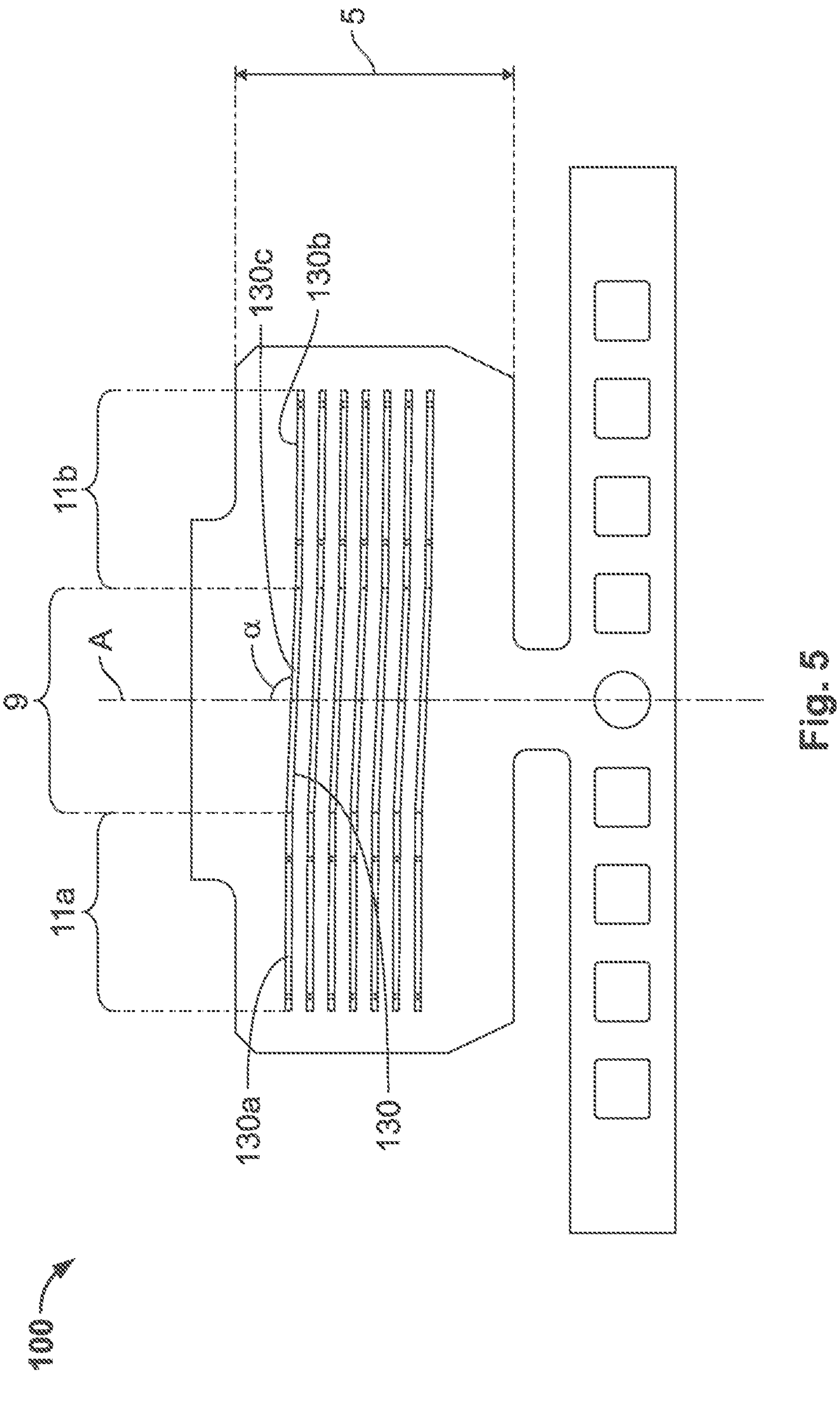
FIG. 5 is a plan view of a crimp terminal according to a second embodiment in an uncrimped state.

FIG. 5 illustrates a second embodiment of a crimp terminal 100 according to the invention in an uncrimped state, i.e. before starting folding and crimping the crimp terminal 100. Elements with the same reference numeral already described and illustrated in FIGS. 1 and 2 will not be described in detail again but reference is made to their description above.

According to the second embodiment, a serration 13*a* of the first side wall 11*a* and a corresponding serration 13*b* of the second side wall 11*b* of the first embodiment are replaced by one-single serration 130. In the second embodiment, and as can be seen in FIG. 5, each serration 130 continuously extends from the first side wall 11 through the base 9 and the second side wall 13. Hence, a first portion 130*a* of the serration 130 of the first side wall 11*a* is connected to a second portion 130*b* of the serration 130 of the second side wall 11*b* by a third portion 130*c* of the serration 130 of the base 9 of the crimping segment 5. As a consequence, the crimping segment 5 can be further rendered structurally stronger and stiffer. Moreover, the manufacturing method for obtaining such serrations can be simplified.

As can be seen in FIG. 5, the serration 130 is not formed by a straight line arranged perpendicularly to the longitudinal axis A of the crimping segment 5. Instead, the serration 130 is slightly "Z-shaped" so that the portion 130*a* of the serration 130 on the first side wall 11*a* is displaced along the longitudinal axis A with respect to the portion 130*b* of the same serration 130 on the second side wall 11*b*. The misalignment of the portion 130*a* of the serration 130 on the first side wall 11*a* with respect to the portion 130*b* of the same serration 130 on the second side wall 11*b* is shown by the angle $\alpha$ which does not form a right-angle with the longitudinal axis A.

Figure 6:
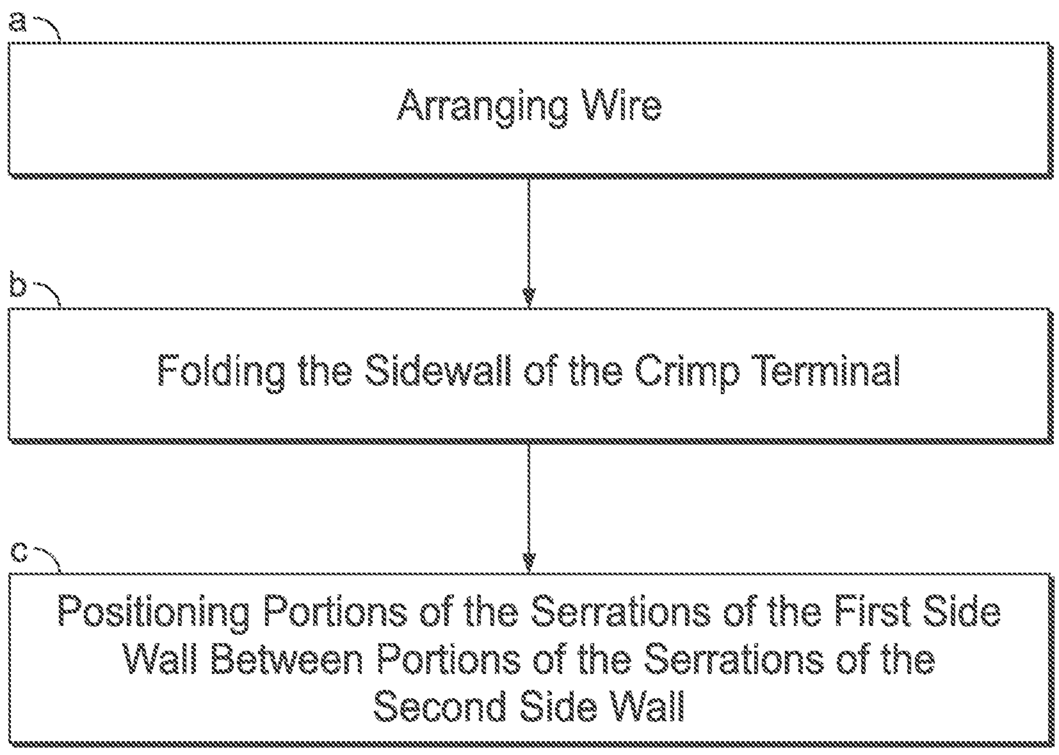
FIG. 6 is a flowchart of a method for preparing the electrical connector.

FIG. 6 illustrates a block diagram relating to the method for preparing the electrical connector 2 as described above. The method can be realized in a completely automated way.

In the first step "a" the wire 4 is arranged on the first surface S1 along the longitudinal axis A of the crimping segment 5. It is understood that wire refers here to a core-wire, i.e. stripped conductors of a wire.

In the next step "b", the opposite sidewalls 11*a*, 11*b* of the crimp terminal 1 are folded towards the longitudinal axis A of the crimping segment 5.

In the next step "c", portions 14*a* of the serration 13*a* of the first side wall 11*a* are positioned between portions 14*b* of the serrations of the second side wall 11*b* along said longitudinal axis A. Thereby, the serrations 13*a* of the first side wall 11*a* produces a form-fit connection with the serrations 13*b* of the second side wall 13*b* along the longitudinal axis A of the crimping segment 5. The form-fit connection allows joining the serrations 13*a*, 13*b* by mechanical locking. The serrations 13*a*, 13*b* are thus interlocked in the crimped state.

Although the embodiments have been described in relation to particular examples, the invention is not limited and numerous alterations to the disclosed embodiments can be made without departing from the scope of this invention. The various embodiments and examples are thus not intended to be limited to the particular forms disclosed. Rather, they include modifications and alternatives falling within the scope of the claims and individual features can be freely combined with each other to obtain further embodiments or examples according to the invention.

What is claimed is:

1. A crimp terminal, comprising:

a crimping segment having a base, a first side wall extending from the base, and a second side wall extending from the base opposite the first side wall, the crimping segment has a first surface adapted for arranging a wire thereon along a longitudinal axis and a second surface opposite the first surface, the first side wall has a first serration protruding from the second surface, the second side wall has a pair of second serrations protruding from the second surface, the first serration is displaced from the second serrations along the longitudinal axis and, in a crimped state, a portion of the first serration is positioned between a pair of portions of the second serrations along the longitudinal axis, the first serration and the second serrations mechanically interlock to realize a form-fit connection.

2. The crimp terminal of claim 1, wherein a width of the first serration corresponds to a distance between the second serrations.

3. The crimp terminal of claim 1, wherein the first serration and the second serrations are arranged perpendicularly to the longitudinal axis.

4. The crimp terminal of claim 1, wherein each of the first serration and the second serrations has a rectangular cross-sectional shape.

5. The crimp terminal of claim 1, wherein the first serration and at least one of the second serrations are connected by a third serration.

6. The crimp terminal of claim 5, wherein the third serration extends at an angle greater than 90° with respect to the longitudinal axis.

7. The crimp terminal of claim 1, wherein, on each of the first side wall and the second side walls, the first serration and the second serrations are spaced apart from a plurality of free-edges of the first side wall and the second side walls.

8. The crimp terminal of claim 1, wherein the first side wall has a first recess extending into the first surface opposite the first serration.

9. The crimp terminal of claim 8, wherein the second side wall has a pair of second recesses extending into the first surface, each of the second recess is opposite one of the second serrations.

10. The crimp terminal of claim 1, wherein the first serration is displaced from the second serrations along the longitudinal axis by an offset that is greater than or equal to a width of the first serration.

11. The crimp terminal of claim 1, wherein the second serrations are spaced apart along the longitudinal axis by an offset that is greater than or equal to a width of each of the second serrations.

12. An electrical connector, comprising:

a crimp terminal including a crimping segment having a base, a first side wall extending from the base, and a second side wall extending from the base opposite the first side wall, the crimping segment has a first surface and a second surface opposite the first surface, the first side wall has a first serration protruding from the second surface, the second side wall has a pair of second serrations protruding from the second surface, the first serration is displaced from the second serrations along a longitudinal axis and, in a crimped state, a portion of the first serration is positioned between a pair of portions of the second serrations along the longitudinal axis, the first serration and the second serrations mechanically interlock to realize a form-fit connection.

13. The electrical connector of claim 12, further comprising a wire enclosed in the crimp terminal in the crimped state.

14. A method for preparing an electrical connector, comprising:

providing a crimp terminal including a crimping segment having a base, a first side wall extending from the base, and a second side wall extending from the base opposite the first side wall, the crimping segment has a first surface and a second surface opposite the first surface, the first side wall has a first serration protruding from the second surface, the second side wall has a pair of second serrations protruding from the second surface;

arranging a wire on the first surface along a longitudinal axis of the crimping segment;

folding the first side wall and the second side wall toward the longitudinal axis of the crimping segment; and positioning a portion of the first serration between a pair of portions of the second serrations along the longitudinal axis, the first serration and the second serrations mechanically interlock and realize a form-fit connection between the first serration and the second serrations along the longitudinal axis.

15. The method of claim 14, wherein the first serration is displaced from the second serrations along the longitudinal axis.

* * * * *